US009321643B2

United States Patent
Denis et al.

(10) Patent No.: US 9,321,643 B2
(45) Date of Patent: Apr. 26, 2016

(54) PROCESS FOR PRODUCING SYNTHESIS GAS WITH PRESERVATION OF THE ENERGY TRANSFER BY MEANS OF THE FUMES

(71) Applicant: L'Air Liquide, Societe Anonyme Pour l'Etude et l'Exploitation des Procedes Georges Claude, Paris (FR)

(72) Inventors: Catherine Denis, Champigny sur Marne (FR); Pascal Marty, Bry sur Marne (FR); Michel-Jean Masson, Nogent sur Marne (FR); Bernd Polster, Frankfurt (DE); Laurent Remy, Villiers sur Marne (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 8 days.

(21) Appl. No.: 14/364,307

(22) PCT Filed: Dec. 11, 2012

(86) PCT No.: PCT/FR2012/052867
§ 371 (c)(1),
(2) Date: Jun. 11, 2014

(87) PCT Pub. No.: WO2013/088049
PCT Pub. Date: Jun. 20, 2013

(65) Prior Publication Data
US 2014/0374662 A1 Dec. 25, 2014

(30) Foreign Application Priority Data
Dec. 14, 2011 (FR) ...................................... 11 61591

(51) Int. Cl.
*C01B 3/38* (2006.01)

(52) U.S. Cl.
CPC .......... *C01B 3/384* (2013.01); *C01B 2203/0233* (2013.01); *C01B 2203/043* (2013.01); *C01B 2203/0827* (2013.01); *C01B 2203/1235* (2013.01); *C01B 2203/1695* (2013.01)

(58) Field of Classification Search
CPC ................. C01B 2203/043; C01B 2203/0827; C01B 2203/1695; C01B 2203/0233; C01B 3/384; C01B 2203/1235
See application file for complete search history.

(56) References Cited

U.S. PATENT DOCUMENTS

2003/0110693 A1   6/2003  Drnevich et al.
2007/0104641 A1 *  5/2007  Ahmed et al. ................ 423/652

(Continued)

OTHER PUBLICATIONS

FR 1161591, Search Report, Sep. 26, 2012 (5 pp).

(Continued)

*Primary Examiner* — Stanley Silverman
*Assistant Examiner* — Syed Iqbal
(74) *Attorney, Agent, or Firm* — Justin K. Murray

(57) ABSTRACT

The present invention concerns a process for producing synthesis gas by steam reforming a hydrocarbon load in a reforming furnace provided with a combustion chamber and a convection chamber; the combustion chamber includes vertical tubes filled with catalyst wherein a mixture of hydrocarbons and steam circulates from top to bottom recovering raw synthesis gas at the bottom of the tubes, and burners disposed in rows heat the tubes; the convection chamber discharges fumes containing the gases produced by the combustion. The process also comprises steps of using the heat contained in the fumes for preheating and/or heating various fluids related or unrelated to the process. In the event of the reduction of the mass flow of fumes, the quantity of energy to be transferred into the convection area is maintained by supplying a supplementary gaseous flow to the combustion area.

13 Claims, 4 Drawing Sheets

(56) References Cited

U.S. PATENT DOCUMENTS

2009/0298957 A1   12/2009   Gauthier et al.
2010/0255432 A1   10/2010   Fuentes et al.
2012/0256132 A1*  10/2012   Polster et al. ................. 252/373

OTHER PUBLICATIONS

PCT/FR2012/052867, International Search Report and Written Opinion, May 3, 2013 (10 pp).

* cited by examiner

PROCESS FOR PRODUCING SYNTHESIS GAS WITH PRESERVATION OF THE ENERGY TRANSFER BY MEANS OF THE FUMES

CROSS REFERENCE TO RELATED APPLICATIONS

This application is a §371 of International PCT Application PCT/FR2012/052867, filed Dec. 11, 2012, which claims the benefit of FR1161591, filed Dec. 14, 2011, both of which are herein incorporated by reference in their entireties.

TECHNICAL FIELD OF THE INVENTION

The present invention relates to a process for producing synthesis gas from a hydrocarbon load comprising at least one step of generating a raw synthesis gas by steam reforming with production of the heat necessary for the reforming by means of combustion in a reforming furnace comprising a combustion chamber and a convection chamber for discharging fumes, the combustion chamber containing vertical tubes filled with catalyst, able to circulate a mixture of hydrocarbons and steam from top to bottom, and burners supplied with fuel and oxidant, and producing, by combustion, flames able to provide the tubes with the heat necessary for reforming, and steps of use of the heat contained in the fumes for preheating and/or heating various fluids related or unrelated to the process.

BACKGROUND

The generation of an $H_2$/CO synthesis gas is done—among other things—by reforming of methane and other light hydrocarbon loads with steam (steam methane reforming or SMR), at very high temperature. Several reactions occur during this reforming step and, though some are exothermic, the initial and main reaction is endothermic, so that it is necessary to provide heat for this step of generating synthesis gas (or syngas).

Various fuels are normally burnt to provide this heat for the reforming, including a so-called primary fuel—typically a mixture of light hydrocarbons ranging from natural gas to naphtha, frequently a fraction taken from the feed gas—and a so-called secondary fuel, consisting at least partly of one or more residual gases resulting directly or indirectly from the method of treating the synthesis gas produced, —in particular, in the event of a final production of hydrogen from the synthesis gas produced, the secondary fuel will contain all or part of the residual gas (or offgas) from the hydrogen purification unit, normally a pressure swing adsorption unit (PSA). These primary and secondary fuels are burnt in the combustion area of the reformers (SMR) in order to provide the heat necessary for reforming. The temperature levels required in the reforming area are very high and, because the temperature at which reforming occurs is above 800° C. (and in general above 850° C.), a large quantity (typically between 40% and 60%) of the heat released during combustion is not used for the reforming. In fact, only the proportion of heat released during the combustion and having a sufficient temperature to provide heat to the reforming process is useful for the reaction. The rest of the heat released by the combustion must be reused in the overall process in order to obtain an acceptable overall thermal efficiency. This proportion of the heat of the combustion that is not used by the reforming reaction is situated in the fumes issuing from the reforming area (radiation) and is recovered in the convection area. This recovery of heat takes place from temperature levels that may reach 1080° C. to a lower temperature limit corresponding to the temperature below which the sending of the fumes to atmosphere is acceptable (around 180° C. or less according to current standards).

The heat available in the fumes can thus cover various requirements, in particular: preheating of the hydrocarbon load;

"steam generation", meaning—by extension—the heating of liquid water or water vapour, and the preheating of demineralised water (DMW) and so-called boiler feed water (BFW), vaporisation and superheating of steam; preheating of combustion air (or exported process air).

The various preheatings take place via exchangers present in the convection area where the fumes circulate. The fumes that have been cooled during the various preheatings are next released into the atmosphere via a blower and/or a flue. The quantity of heat available for these various heatings depends on the temperature of the fumes, but also obviously on the flow rate thereof.

During combustion, the fuels (primary and/or secondary) are burnt in the presence of oxidants (also referred to as oxidising agents); air (which may be depleted of or enriched with oxygen), an oxygen provider, is typically used as an oxidant.

The air may be air depleted of oxygen (but at least 10% $O_2$ in air), or enriched with oxygen (up to 40% $O_2$ in air).

The air must always be in excess—with respect to stoichiometry of the combustion reaction—so that all the fuel gases are consumed, but in limited excess. It is sought to adapt the quantity of air so as to keep the excess of air to a level of 5% minimum, without exceeding 40% with respect to the requirements of the stoichiometry of the combustion, preferably between 5% and 20% with respect to stoichiometry.

Providing a limited excess of air makes it possible:
firstly to adapt the consumption of fuel (PSA residual gas and primary fuel) to the requirements for heat, both for the reforming reaction in the radiation area (heat necessary for achieving a high temperature, above 1000° C.) and for the various preheatings in the convection area (hydrocarbons, DMW, BFW, generation and superheating of steam, preheating of air, etc.),
secondly to limit the concentration of excess oxygen that is situated in the fumes; the oxygen content of the fumes must in fact remain limited; the oxygen concentration of the fumes in the convection area (fume chain) must remain less than the minimum concentration of oxygen required for ensuring the combustion of any hydrocarbons present (minimum oxygen concentration or MOC)—the expression MOC will be used in the remainder of the description to mean "minimum concentration of oxygen required for ensuring combustion". Observing this precaution means that, in the event of a leakage of hydrocarbons, at a heat exchanger for preheating the hydrocarbon load for example, the oxygen content is too low for the hydrocarbons issuing from the leakage and present in the convention area to ignite.

Moreover, current constraints, in particular economic and environmental, mean that frequently some of the compounds inert towards combustion, which were normally present in the offgas of the PSA, are taken off (before or after the PSA) but in all cases prior to the recycling of the stream or streams concerned to the reforming burners. This is in particular a consequence of the extraction of $CO_2$ via the direct liquefaction of the offgas of the PSA or the primary decarbonation of the synthesis gas via the MDEA, before the PSA.

However, if the inert compounds extracted from the secondary fuel do not contribute to combustion, their presence does however require additional fuel for heating them up to the temperature level necessary for a flame temperature enabling the reforming action to take place with suitable efficiency. Their presence in the fumes contributes to the volume thereof and represented a large quantity of heat usable in the convention area; a reduction in the quantity of inert compounds in the gaseous mixture sent to the burners therefore signifies reduced heating requirements, a reduced requirement for fuel, and therefore a requirement for oxidant, that is to say air, that is also reduced.

In this case, maintaining the excess air within the limits required for the oxygen content in the fumes to remain below the MOC also contributes to reducing the total mass flow of the fumes.

It can therefore be seen that, because of the capture of the $CO_2$ previously present in the residual PSA, the reforming fumes are reduced not only with respect to the $CO_2$ coming from the residual gas but also with respect to a certain quantity of inert substances brought by the air, because of the reduction in the quantity of air necessary for heating the gases present during combustion.

A first consequence of the reduction in the volume of the fumes is that, the prime function of the combustion being to provide for the requirements of the reforming reaction, the reduction in the contribution of heat to the tubes by the combustion gases emitted in the combustion chamber will be compensated for by a suitable increase in the supply of oxidant (air) and by a greater makeup of primary fuel.

Nevertheless, the quantity of heat available in the convection area of the SMR is greatly reduced and the contribution of heat necessary for the various preheatings normally provided in the convection area is no longer assured. A first problem then lies in the fact that it is no longer possible to maintain the preheating temperatures and/or the quantities of fluids preheated in the convection area such as they were assured when the inert substances were present in the fumes. This reduction in the preheating possibilities via the fumes may be detrimental to the reforming process itself (reduction in the efficacy of the reforming because of insufficient preheating of the various reagents, and reduction in the production of steam). A second problem then stems from this, the heat exchangers present in the convection area being designed with given operating ranges, depending on the quantity of inert compounds taken off, the process may be situated outside suitable ranges, which will require expensive modifications to them.

It is therefore important, in order to avoid the aforementioned drawbacks, to be able to maintain the quantity of transferable heat in the convection area of an SMR furnace in the event of removing inert substances from a gas supplying the combustion of said SMR furnace; in particular, in the event of capture of the carbon dioxide normally present in the residual PSA gas, it contains, in the absence of capture of $CO_2$ upstream of the PSA, a large proportion of $CO_2$ of around 40% or more.

SUMMARY OF THE INVENTION

The aim of the invention is to propose a reforming process in a steam reforming furnace making it possible, in the event of reduction in the flow of secondary fuel gas resulting from a modification to the composition of the gaseous mixture supplying the secondary fuel, either by reducing the proportion of inert compounds or by reducing the proportion of all or some of the compounds participating in the combustion reaction with air (typically $CO$, $CH_4$, $H_2$) in said fuel gas, to maintain the transferable heat in the convection area by maintaining the flow of fumes in the convection area.

In the event of a reduction in the $CO_2$ content in the residual PSA gas or upstream of the PSA, but in all cases upstream of its use as a secondary fuel, this capture of $CO_2$ on the residual gas prior to the sending thereof to the burners results directly in a great reduction in the volume of fumes.

In the event of a reduction in the proportion of all or some of the compounds participating in the combustion reaction with air (typically $CO$, $CH_4$, $H_2$) in said secondary fuel gas, the deficit in the combustion of the $CO$ and/or $H_2$ and/or $CH_4$ of the secondary fuel used as a fuel for the reforming leads to the reduction in the steam and $CO_2$, which are no longer produced.

This is obtained, according to the solution of the invention, by compensating for the reduction in the gaseous flow of the fumes by an increase in the flow of at least one other constituent forming part of the fumes or by introducing another inert gas into the combustion. This supplementary flow having to be heated to the flame temperature of the combustion, it consequently results in an increase in the flow of primary fuel.

In one embodiment, the invention thus concerns a process for producing synthesis gas, intended for a final production of hydrogen, from a hydrocarbon load, comprising at least:
  a step of generating a raw synthesis gas by steam reforming of said hydrocarbon load with production of the heat necessary for the reforming by means of a combustion, said step of generating the synthesis gas being performed in a reforming furnace comprising at least:
    a combustion chamber containing one or more rows of vertical tubes filled with catalyst, able to circulate a mixture containing the hydrocarbon load and steam from top to bottom, so as to recover the raw synthesis gas at the bottom of the tubes, and burners disposed in rows, said burners being supplied with fuel and combustion air and producing, by combustion, flames able to heat the tubes and gases;
    at least one convection chamber able to discharge fumes containing the gases produced by the combustion, as well as:
  steps of using heat contained in the fumes for the preheating and/or the heating of various fluids related or not to the process,
  and in which the fuel comprises at least one primary fuel and a secondary fuel, which itself comprises at least one residual gas in relation to the synthesis gas production method,
  characterised in that, in the event of a reduction of the mass flow of the fumes, a supplementary gas flow is supplied in the combustion area in order to help to maintain the quantity of energy to be transferred into the convection area.

The reduction in the mass flow of fumes stems mainly from the modification to the composition of the secondary fuel.

The process is thus particularly advantageous when the synthesis gas undergoes a separation of the hydrogen contained pressure swing adsorption unit (PSA) in order to produce hydrogen and when the secondary fuel used contains residual gas coming from said separation, in particular in the event that the reduction in the mass flow of fumes stems from the fact that carbon dioxide has been eliminated from the residual gas in relation to the hydrogen production process prior to use thereof as a secondary fuel; however, also in the event that at least some of the reduction in the fumes stems from the fact that carbon monoxide and/or methane and/or hydrogen had been eliminated from the residual gas in relation to the hydrogen production process prior to its use as a secondary fuel.

Thus the invention makes it possible to maintain the ability of the fumes to provide the preheatings and heatings of fluids required, and also makes it possible to operate the various heat exchangers and other related equipment in a satisfactory manner.

In other embodiments, the invention may have all or some of the following features:
- the supplementary gas flow supplied in the combustion area is a flow of a gas inert towards the combustion reaction,
- this inert gas may be nitrogen;
- a flow of nitrogen may be injected into the combustion air, via one or more injections upstream of the first air preheating exchanger, or downstream of said first air preheating exchanger, and, in the event of the presence of a second air preheating exchanger, upstream or downstream of said second air preheating exchanger;
- the supplementary inert gas flow supplied to the combustion area may be saturated or superheated steam;
- the steam may directly supply the burners in the combustion area, independently of the combustion air and the fuel;
- the steam may alternatively be previously mixed with the combustion air, or with the fuel;
- the steam may come from the reforming process itself or be imported;
- if the steam is available at an excessive pressure, it may be previously reduced to a pressure compatible with its use, generally at low pressure, preferably below 5 bara;
- when the steam is previously mixed with the combustion air and/or with the fuel, if this fluid is not available at a sufficient pressure, the use of steam at a pressure above the combustion pressure may make it possible, via an ejector, used to effect the steam/fluid mixing, to increase the pressure of this fluid up to this combustion pressure;
- the fuel flow (primary and/or secondary) may be adapted to take into account the modification to the gaseous composition with regard to the combustion related to the introduction of an inert gas different from that for which it is substituted;
- the additional gaseous flow supplied in the combustion area may be an additional flow of air when the excess air before addition of the supplementary gaseous flow is low, between 5% and 20%; in this case, the supplementary gaseous flow supplied in the combustion area may be a flow of air, subject to the additional supply being done so that the excess air remains below 40%;
- the supplementary air flow may be injected via the existing fresh air blower and/or a new air blower, either with a sufficiently greater capacity for being substituted for the existing fresh air blower, or via an additional air blower intended for the total or partial treatment of the supplementary air flow in addition to the existing fresh air blower;
- alternatively, the proportion of the supplementary air flow passing through the new additional blower is injected into the combustion air, either upstream of the $1^{st}$ air preheating exchanger or downstream of said $1^{st}$ air preheating exchanger and, in the event of the presence of a $2^{nd}$ air preheating exchanger, upstream or downstream of said $2^{nd}$ preheating exchanger;
- advantageously, a device will be added for monitoring the hydrocarbon content in the fumes that can be coupled to a device for protecting the reformer (stoppage of reformer, reduction in air flow, etc.) so as to detect the presence of hydrocarbons in the fumes coming from a leak, in particular at an exchanger for preheating the load (which would come for example from a leak in one of the coils for preheating the load prior to the pre-reforming or reforming), thus making it possible to operate the reformer with oxygen contents in the fumes close to or above the MOC.

The addition of this device therefore makes it possible to accept a higher oxygen content in the fumes without risk. This improvement is particularly useful in the context of the invention, when it is chosen to increase the proportion of air in the fumes; more generally, this device is useful when the oxygen content in the fumes is close to the MOC, in some particular circumstances this acceptable upper limit of $O_2$ concentration may in fact be reached or exceeded, for example during functioning of the apparatus in degraded mode, whether it is functioning at reduced capacity, or during transient phases, or others, and the excess of oxygen may lead to an oxygen concentration above the MOC. The addition of this device enables the reformer thus protected to function in the event of running at reduced capacity, start up, stoppage, or increase or reduction of the capacity.

This improvement can be provided during the construction of the apparatus, or form part of a modification to the apparatus.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
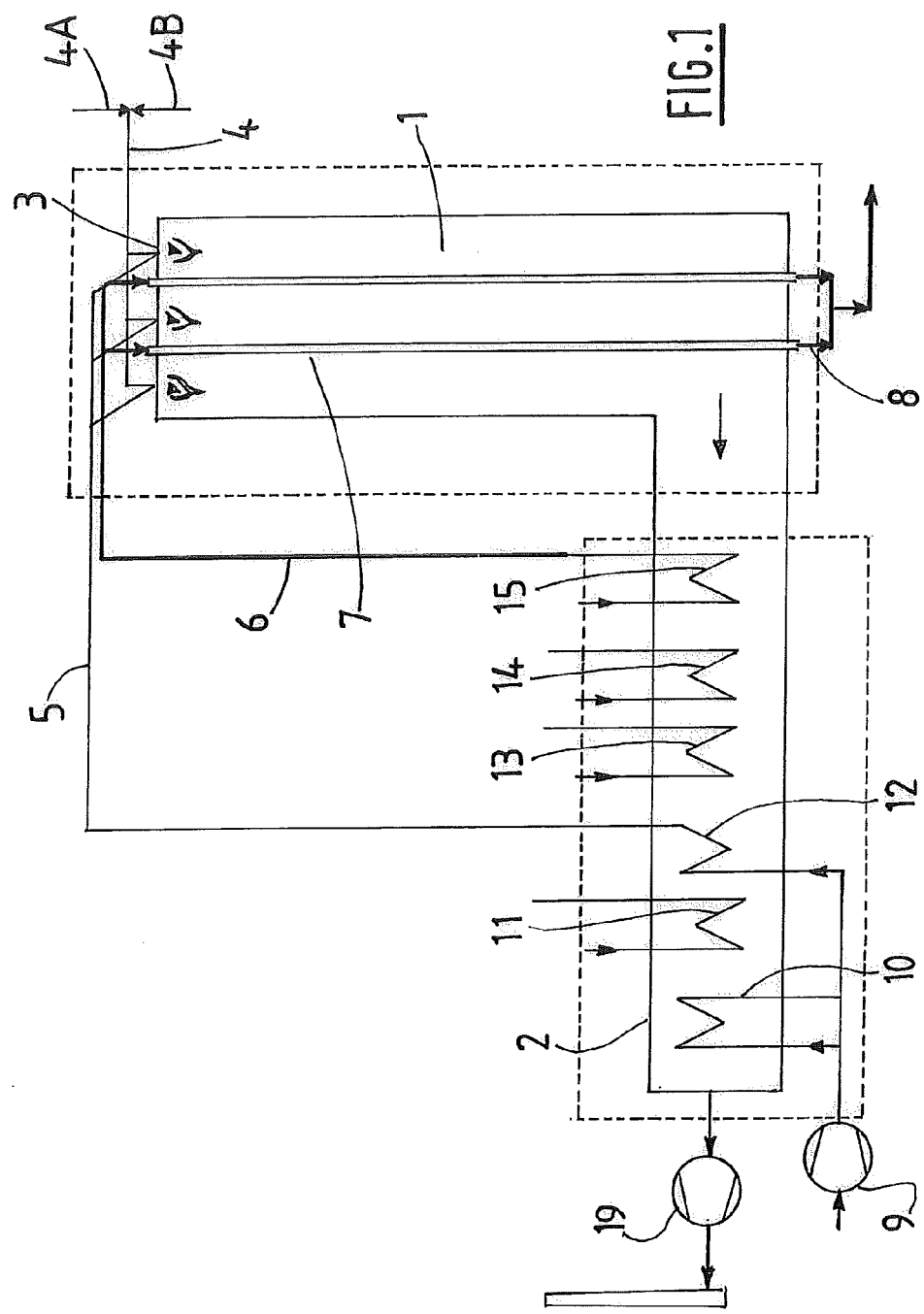
FIG. 1 provides a schematic view of a known steam top fired reforming furnace.

FIG. 1 presents a schematic view of a known steam reforming furnace top fired, showing the various elements constituting the reformer useful for an understanding of the invention, as well as the various fluids circulating.

The treatment of the synthesis gas 8, downstream of the reformer for obtaining hydrogen, is not shown. Conventionally, it is a PSA treatment, with production of a residual gas.

The combustion chamber 1 and the convection chamber 2 can be seen in the Figure. The combustion chamber is equipped with burners in the vault 3, supplied at 4 with fuel: fuel 4A and residual PSA gas 4B, as well as with preheated air as an oxygent 5. The preheated process feed gas 6 supplies the reforming tubes 7. The synthesis gas 8 is recovered at the outlet of the reforming tubes.

The preheated air is obtained from fresh air, injected via a fresh combustion air blower 9, and preheated in air preheaters 10 and then, optionally, 12.

Various means for heating fluids by means of the combustion gases are also shown in the Figure, in particular a steam generation 11, a steam superheating 13, an preheating (optional) of the pre-reforming load 14, and a heating of the reforming load 15.

The combustion gases thus cooled are discharged via a fume extraction fan 19.

Figure 2:
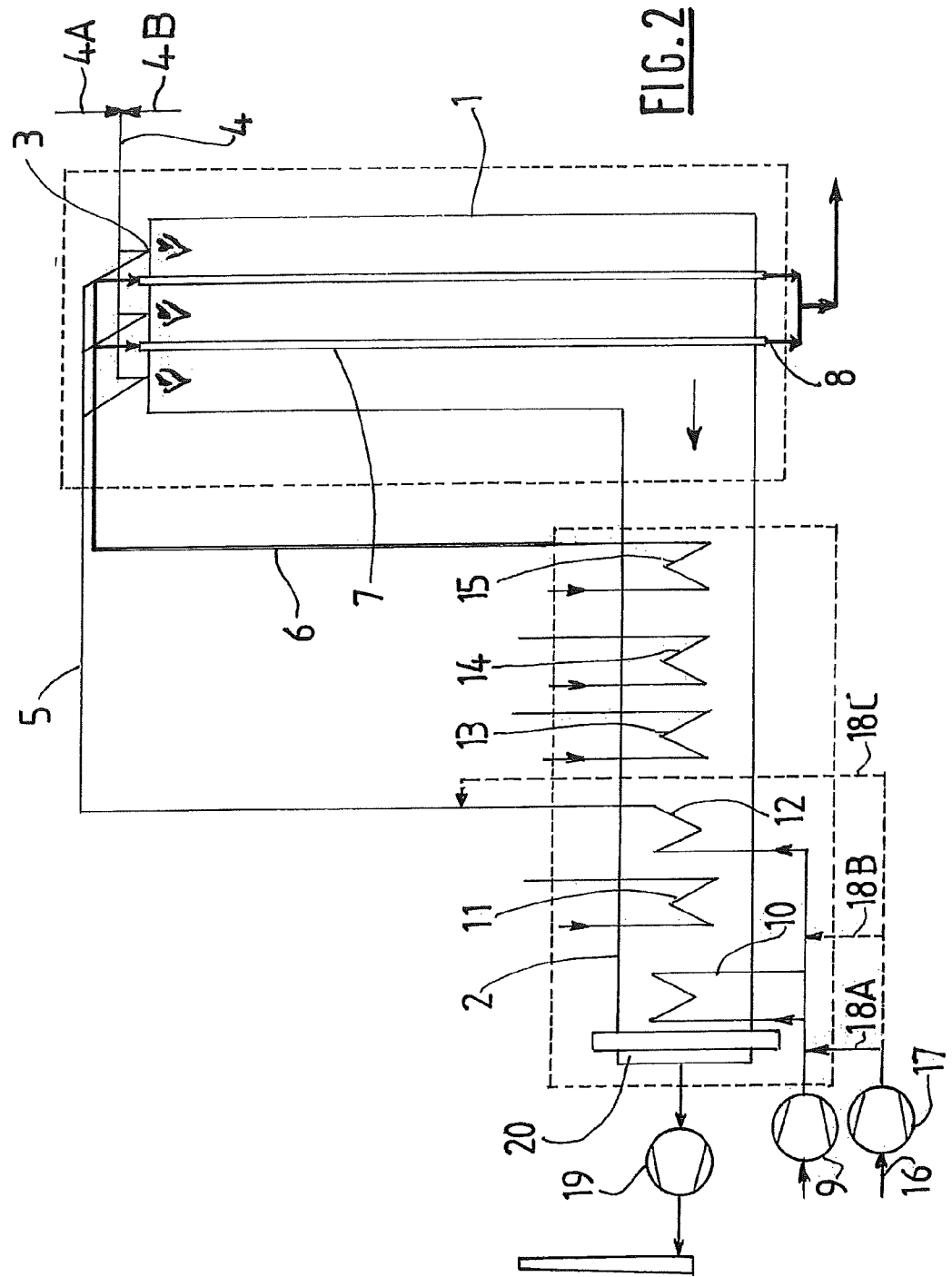
FIG. 2 provides a schematic view of a steam reforming furnace top fired, suitable for implementing a variant of the process according to the invention.

FIG. 2 presents a schematic view of a steam reforming top fired furnace, suitable for implementing a first variant of the invention. This furnace differs from the one in FIG. 1 in that it is also equipped with means for supplying an additional combustion air flow, said means comprising an additional fresh air source 16, an additional blower 17, intended to treat all or part of the additional fresh air flow—it should be noted that, if the capacity of the blower 9 is sufficient to receive the total fresh air flow, it will not be necessary to add this second blower 16, and it is also possible to plan or replacing the existing blower 9 with a new blower 9, of sufficient capacity to process all of the combustion air. When an additional blower 16 is present, the additional air blown 18 can be injected in whole or in part at 18A upstream of the preheater 10, or downstream of the air preheater 10, and in this second case it may be injected at 18B upstream or at 18C downstream of the optional air preheater 12.

The furnace according to the invention as presented here also has a device 20 for monitoring the hydrocarbon content of the fumes; this monitoring device 20 is coupled to a device for protecting the reformer (not shown in the Figure) which, in the event that hydrocarbons are detected—said hydrocarbons being able to come from a leak at the preheating means 14 and/or 15—modifies the operation of the apparatus, or stops it according to the defined safety protocol. This protocol may provide for example for a reduction in the air flow, a stoppage of the reformer, or any other suitable solution.

Figure 3:
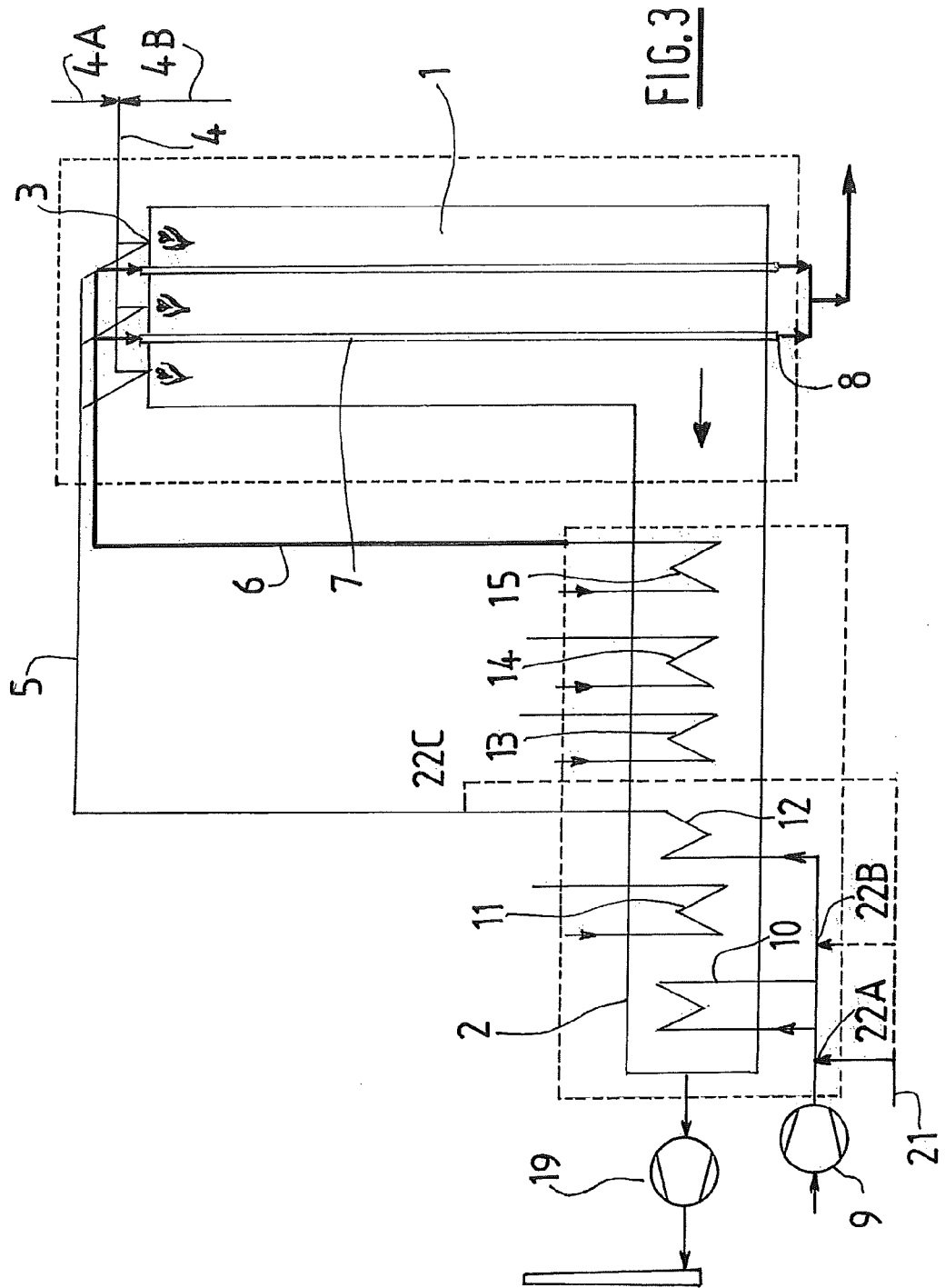
FIG. 3 provides a schematic view of a steam reforming furnace top fired, suitable for implementing a second variant of the process of the invention.

FIG. 3 presents a schematic view of a steam reforming top fired furnace, able to implement a second variant of the invention. This furnace differs from the one in FIG. 1 in that it is also equipped with means of supplying a flow 21 of nitrogen (or more generally inert gas) in addition to the flow of combustion air. The inert gas can be injected, in the same way as the additional air, that is to say in whole or in part at 22A upstream of the preheater 10, or downstream of the air preheater 10, in this second case, it can be injected at 22B upstream, or at 22C downstream, of the optional preheater 12.

This injection of inert gas aims to compensate for the reduction—in the combustion gases—of inert gases (essentially $CO_2$) normally present in the PSA off gas supplying the burners.

Figure 4:
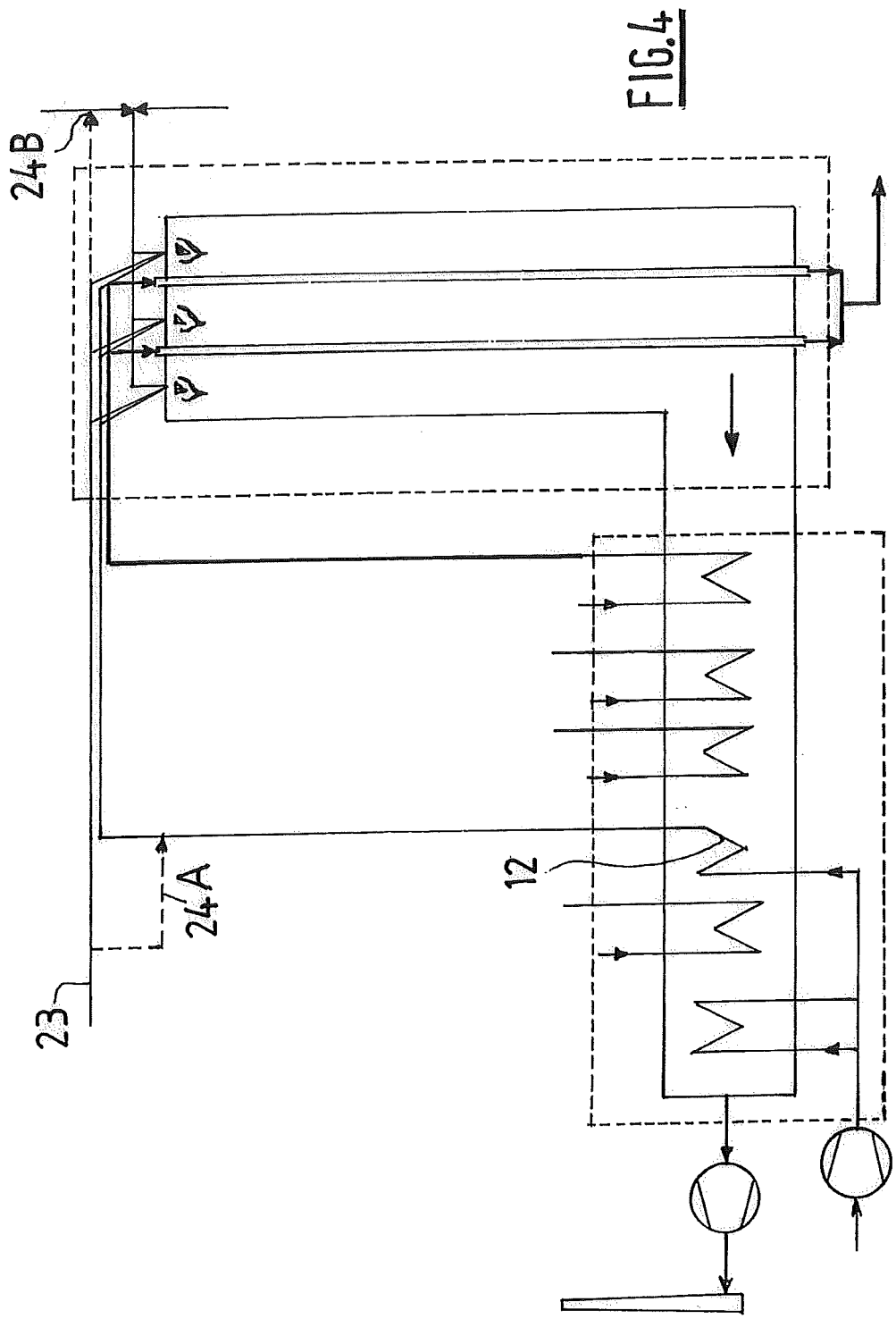
FIG. 4 provides a schematic view of a steam reforming furnace heated top fired, suitable for implementing a third variant of the process according to the invention.

FIG. 4 presents a schematic view of a steam reforming top fired furnace, able to implement a third variant of the invention. This furnace differs from the one in FIG. 1 in that it is also equipped with means of injecting steam 23 (saturated or superheated) in replacement for the inert gases that were taken off before or after the PSA ($CO_2$ mainly, but also potentially nitrogen and other inert gases). The steam can be injected in whole or in part at 24A in the preheated combustion air, or wholly or partly at 24B in the fuel. It may also—according to a mode not shown in the Figure—be injected into each of burners separately from the combustion air and fuel.

The improvements proposed above in the context of steam reforming can also be applied to any device implementing a method having recourse to the combustion of one or more offgases consisting partly of inert gases (PSA residual gas, $H_2$/CO cold box, etc.), and for which the combustion heat is used at least partly for preheating, heating and vaporisation operations (hydrocarbons before reaction, demineralised water, boiler water, steam, combustion air, etc.).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A process for producing synthesis gas from a hydrocarbon load, the process comprising the steps of:
generating a raw synthesis gas by steam reforming of said hydrocarbon load with production of the heat necessary for the reforming by means of a combustion, said step of generating the synthesis gas being performed in a reforming furnace comprising at least:
a combustion chamber containing one or more rows of vertical tubes filled with catalyst, the combustion chamber configured to circulate a mixture containing the hydrocarbon load and steam from top to bottom, so as to recover the raw synthesis gas at the bottom of the tubes, and burners disposed in rows, said burners being supplied with fuel and combustion air and producing, by combustion, flames operable to heat the tubes and gases;
at least one convection chamber configured to discharge fumes containing the gases produced by the combustion;
using heat contained in the fumes for the preheating and/or the heating of various fluids related or not to the process,
wherein the fuel comprises at least one primary fuel and a secondary fuel, wherein the secondary fuel comprises at least one residual gas in relation to the synthesis gas production process;

measuring a mass flow of the fumes;

supplying a supplementary gas flow to the combustion area if there is a reduction in the measured mass flow of the fumes, such that the quantity of energy to be transferred into the convection area is maintained, wherein the supplementary gas flow supplied to the combustion area is a flow of gas inert towards the combustion reaction.

2. The process according to claim 1, in which the reduction in the mass flow of fumes is caused by the step of removing carbon dioxide from the residual as in relation to the hydrogen production process prior to use thereof as a secondary fuel.

3. The process according to claim 1, in which at least some of the reduction of the fumes is caused by removal of carbon monoxide and/or methane and/or hydrogen from the residual gas in relation to the hydrogen production process prior to use thereof as a secondary fuel.

4. The process according to claim 1, in which the supplementary gaseous flow supplied is a flow of nitrogen and is injected in the combustion air, via one or more injections upstream of the first air preheating exchanger, or downstream of said first air preheater exchanger, and, in the event of the presence of a second air preheating exchanger, upstream or downstream of said second air preheating exchanger.

5. The process according to claim 1, in which the supplementary gaseous flow supplied in the combustion area is a flow of steam, saturated or superheated.

6. The process according to claim 5, in which the steam directly supplies the burners in the combustion area, independently of the combustion air and fuel.

7. The process according to claim 5, in which the steam is mixed with the combustion air or with the fuel prior to the supply to the burners.

8. The process according to claim 5, in which the steam comes from the reforming process itself or is imported.

9. The process according to claim 8, further comprising the step of determining if the pressure of the fuel and combustion air supplied to the burners is at sufficiently high pressure, and if at least one of these fluids is not available at a sufficient pressure, increasing the pressure, via an ejector, of a mixture fluid composed of the steam that is to be mixed with fluid selected from the group consisting of the combustion air the fuel, or combinations thereof, prior to the supply to the burners.

10. The process according to claim 1, in which the excess air before the addition of the supplementary gaseous flow is between 5% and 20%, characterised in that the supplementary gaseous flow supplied in the combustion area is a flow of air and the supplementary supply is made so that the excess air remains below 40%.

11. The process according to claim 10, in which the supplementary air flow is injected via an existing fresh air blower and/or a new air blower, either with a greater capacity sufficient to substitute the existing fresh air blower, or an additional air blower, intended for the total or partial processing of the supplementary air flow, in addition to the existing fresh air blower.

12. The process according to claim 11, in which the part of the supplementary air flow passing through the new additional blower is injected in the combustion air, either upstream of the $1^{st}$ preheating exchanger, or downstream of said $1^{st}$ air preheating exchanger and, in the event of the presence of a second air preheating exchanger, upstream or downstream of said $2^{nd}$ air preheating exchanger.

13. The process according to claim 1, in which a device is added for monitoring the hydrocarbon content in the fumes that can be coupled to a device for protecting the reformer, so as to detect the presence of hydrocarbons in the fumes coming from a leak, in particular at an exchanger for preheating the load.

* * * * *